United States Patent
Tinnin et al.

(10) Patent No.: US 9,545,942 B2
(45) Date of Patent: Jan. 17, 2017

(54) ASSEMBLY DETECTION MEANS

(71) Applicant: STEERING SOLUTIONS IP HOLDING CORPORATION, Saginaw, MI (US)

(72) Inventors: Melvin L. Tinnin, Clio, MI (US); Joen C. Bodtker, Gaines, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 7 days.

(21) Appl. No.: 14/332,593

(22) Filed: Jul. 16, 2014

(65) Prior Publication Data

US 2016/0016603 A1   Jan. 21, 2016

(51) Int. Cl.
| | |
|---|---|
| B62D 1/16 | (2006.01) |
| B62D 1/20 | (2006.01) |
| F16D 1/08 | (2006.01) |
| F16D 3/38 | (2006.01) |
| F16B 37/04 | (2006.01) |

(52) U.S. Cl.
CPC . *B62D 1/16* (2013.01); *B62D 1/20* (2013.01); *F16B 37/041* (2013.01); *F16D 1/0894* (2013.01); *F16D 3/387* (2013.01)

(58) Field of Classification Search
CPC ......... F16B 37/02; F16B 37/04; F16B 37/041; F16B 37/043; F16B 37/044; F16B 37/045; F16B 37/046; F16B 37/047; F16D 1/02; B62D 1/16
See application file for complete search history.

(56) References Cited

U.S. PATENT DOCUMENTS

| | | | | | |
|---|---|---|---|---|---|
| 3,009,499 | A | * | 11/1961 | Weihe | F16B 37/041 29/432 |
| 3,342,237 | A | * | 9/1967 | Meehan | F16B 5/02 29/450 |
| 3,999,583 | A | * | 12/1976 | Nelson | F16B 37/041 411/182 |
| 4,219,064 | A | * | 8/1980 | Lozano | F16B 37/044 411/103 |
| 4,883,397 | A | * | 11/1989 | Dubost | F16B 2/245 24/563 |
| 4,900,178 | A | * | 2/1990 | Haldric | B62D 1/16 403/12 |
| 4,955,772 | A | * | 9/1990 | Reck | F16B 37/041 411/175 |
| 5,253,949 | A | * | 10/1993 | Oxley | B62D 1/16 403/155 |
| 5,273,384 | A | * | 12/1993 | Dunbar | F16B 37/041 411/174 |

(Continued)

*Primary Examiner* — Barry Gooden, Jr.
(74) *Attorney, Agent, or Firm* — Cantor Colburn LLP

(57) ABSTRACT

In one aspect of the invention, a clip nut for shaft assembly having a tubular shaft is provided. The clip nut includes a first end having a first aperture, a second end having an inwardly extending projection portion with a second aperture extending therethrough, and a connecting portion extending between the first end and the second end. The first and second ends are configured to extend around the tubular shaft such that the projection portion extends into the tubular shaft, and the first and second apertures are configured to receive a fastener to couple the clip nut to the tubular shaft.

11 Claims, 3 Drawing Sheets

(56) References Cited

U.S. PATENT DOCUMENTS

| | | | | |
|---|---|---|---|---|
| 5,294,224 A * | 3/1994 | Kent | ............... | F16B 37/041 411/174 |
| 5,423,646 A * | 6/1995 | Gagnon | ............... | F16B 37/041 411/174 |
| 5,606,892 A | 3/1997 | Hedderly | | |
| 5,765,408 A | 6/1998 | Sanseverino | | |
| 5,890,858 A * | 4/1999 | Leroux | ............... | F16B 37/041 411/175 |
| 5,961,264 A * | 10/1999 | Postadan | ............... | F16B 37/041 411/174 |
| 6,006,414 A * | 12/1999 | Corporon | ............... | F16B 37/041 29/525.02 |
| 6,010,289 A * | 1/2000 | DiStasio | ............... | C07C 213/10 411/174 |
| 6,155,739 A * | 12/2000 | Sekine | ............... | B62D 1/16 403/12 |
| 6,263,562 B1 * | 7/2001 | Gosis | ............... | B25B 31/00 29/809 |
| 6,443,650 B2 * | 9/2002 | Ikeda | ............... | F16D 3/16 403/12 |
| 6,450,747 B1 * | 9/2002 | Fischer | ............... | F16B 27/00 206/338 |
| 6,533,666 B2 | 3/2003 | Garcia et al. | | |
| 6,575,658 B2 * | 6/2003 | Daniel | ............... | B62D 1/20 403/21 |
| 6,688,825 B1 * | 2/2004 | Stewart | ............... | F16B 37/041 411/174 |
| 6,711,809 B1 * | 3/2004 | Fischer | ............... | B25B 31/00 29/809 |
| 6,770,825 B1 * | 8/2004 | Hildebrand | ............... | F02P 7/021 123/146.5 R |
| 7,318,687 B2 * | 1/2008 | Appleyard | ............... | B62D 1/16 403/157 |
| 7,488,134 B2 * | 2/2009 | Kinme | ............... | B62D 1/16 403/12 |
| 7,513,709 B2 * | 4/2009 | Shimada | ............... | B62D 1/16 403/236 |
| 7,517,284 B2 * | 4/2009 | Sekine | ............... | B62D 1/16 464/134 |
| 8,231,476 B2 * | 7/2012 | Kakimoto | ............... | F16D 1/0864 464/135 |
| 2001/0012470 A1 * | 8/2001 | Ikeda | ............... | B62D 1/20 403/290 |
| 2002/0076300 A1 * | 6/2002 | Patterson, Jr. | ............... | F16B 37/041 411/92 |
| 2002/0131820 A1 * | 9/2002 | Daniel | ............... | B62D 1/20 403/316 |
| 2004/0001743 A1 * | 1/2004 | Hulin | ............... | F16B 37/043 411/175 |
| 2004/0185947 A1 * | 9/2004 | Kinme | ............... | B62D 1/16 464/182 |
| 2005/0129481 A1 * | 6/2005 | Wimmer | ............... | F16B 37/041 411/175 |
| 2006/0034650 A1 * | 2/2006 | Appleyard | ............... | B62D 1/16 403/14 |
| 2007/0237571 A1 * | 10/2007 | Shimada | ............... | B62D 1/16 403/74 |
| 2007/0259721 A1 | 11/2007 | Scrimpsher et al. | | |
| 2009/0285651 A1 * | 11/2009 | Cooley | ............... | B29C 45/2618 411/106 |
| 2009/0311071 A1 * | 12/2009 | Allen | ............... | F16B 37/043 411/172 |
| 2011/0088502 A1 | 4/2011 | Brown et al. | | |
| 2012/0284973 A1 * | 11/2012 | Glaser | ............... | F16B 5/121 24/457 |
| 2012/0326424 A1 * | 12/2012 | Zaloga | ............... | B62D 1/16 280/775 |
| 2013/0017892 A1 | 1/2013 | Moriyama et al. | | |
| 2013/0026750 A1 * | 1/2013 | Doerr | ............... | B62D 1/16 285/81 |
| 2013/0069345 A1 * | 3/2013 | Williams | ............... | B60R 21/20 280/728.2 |
| 2013/0260903 A1 | 10/2013 | Kim | | |
| 2013/0327496 A1 * | 12/2013 | Hirukawa | ............... | F01P 3/18 165/41 |
| 2014/0140759 A1 * | 5/2014 | Bodtker | ............... | F16D 1/0894 403/322.2 |
| 2014/0147197 A1 | 5/2014 | Yoshida et al. | | |
| 2014/0230597 A1 * | 8/2014 | Tinnin | ............... | B62D 1/16 74/496 |
| 2014/0345091 A1 * | 11/2014 | Pierce | ............... | F16B 2/20 24/326 |

\* cited by examiner

ASSEMBLY DETECTION MEANS

FIELD OF THE INVENTION

The subject invention relates to a steering column assembly, and more particularly to a steering column assembly with improved coupling between an intermediate shaft and a steering column shaft that provides for detections and proper assembly.

BACKGROUND OF THE INVENTION

Some known steering column assemblies are configured such that when a driver rotates a steering wheel in a desired direction, a steering column shaft connected to the steering wheel is rotated, and an intermediate shaft transmits the rotary force of the steering shaft through a universal joint to a gear box, which may include a rack and pinion gear.

The gear box converts the rotational motion of the steering shaft into a rectilinear motion by the rack and pinion gear, and transmits the rectilinear motion to a rack bar. As such, the rack bar transmits the force to a tie rod connected to a tire knuckle such that the driving direction of the vehicle can be changed.

The axis between the steering shaft and the gear box is configured by an input shaft and an output shaft which are angled to each other rather than being coaxially aligned, which makes it difficult to transmit power with a conventional shaft coupling method. As such, an intermediate shaft and universal joint are utilized so as to make the angle of the steering shaft variable within a predetermined range. However, during shipping or operation, the coupling between the intermediate shaft and the universal joint may become loose or uncoupled. Accordingly, it is desirable to provide an improved coupling between the intermediate shaft and the universal joint.

SUMMARY OF THE INVENTION

In one aspect of the invention, a clip nut for shaft assembly having a tubular shaft is provided. The clip nut includes a first end having a first aperture, a second end having an inwardly extending projection portion with a second aperture extending therethrough, and a connecting portion extending between the first end and the second end. The first and second ends are configured to extend around the tubular shaft such that the projection portion extends into the tubular shaft, and the first and second apertures are configured to receive a fastener to couple the clip nut to the tubular shaft.

In another aspect of the invention, a shaft assembly is provided. The shaft assembly includes a tubular shaft having a first aperture and a second aperture formed therethrough, a solid shaft having a third aperture formed therethrough, and a clip nut having a first end, a second end, and a connecting portion extending therebetween. The first end includes a fourth aperture and the second end includes an inwardly extending projection portion with a fifth aperture extending therethrough. The solid shaft is configured for insertion into the tubular shaft, and the clip nut is configured for extending about the tubular shaft such that the projection portion extends into the first aperture and the third aperture. The first, second, third, fourth, and fifth apertures are configured to align.

In yet another aspect of the invention, a method of assembling a steering column assembly is provided. The method includes providing a steering column shaft having a first aperture and a second aperture formed therethrough, providing a yoke having a base shaft and a pair of yoke ears extending therefrom, the base shaft having a third aperture formed therethrough, and providing a clip nut having a first end, a second end, and a connecting portion extending therebetween. The first end includes a fourth aperture, and the second end includes an inwardly extending projection portion with a fifth aperture extending therethrough. The method further includes positioning the clip nut about the steering column shaft such that the projection portion extends into the first aperture and the fourth aperture is aligned with the second aperture, inserting the base shaft into the tubular shaft until the third aperture is positioned to receive the projection portion therein, and inserting a fastener through the first, second, third, fourth, and fifth apertures to couple the steering column shaft and the yoke.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
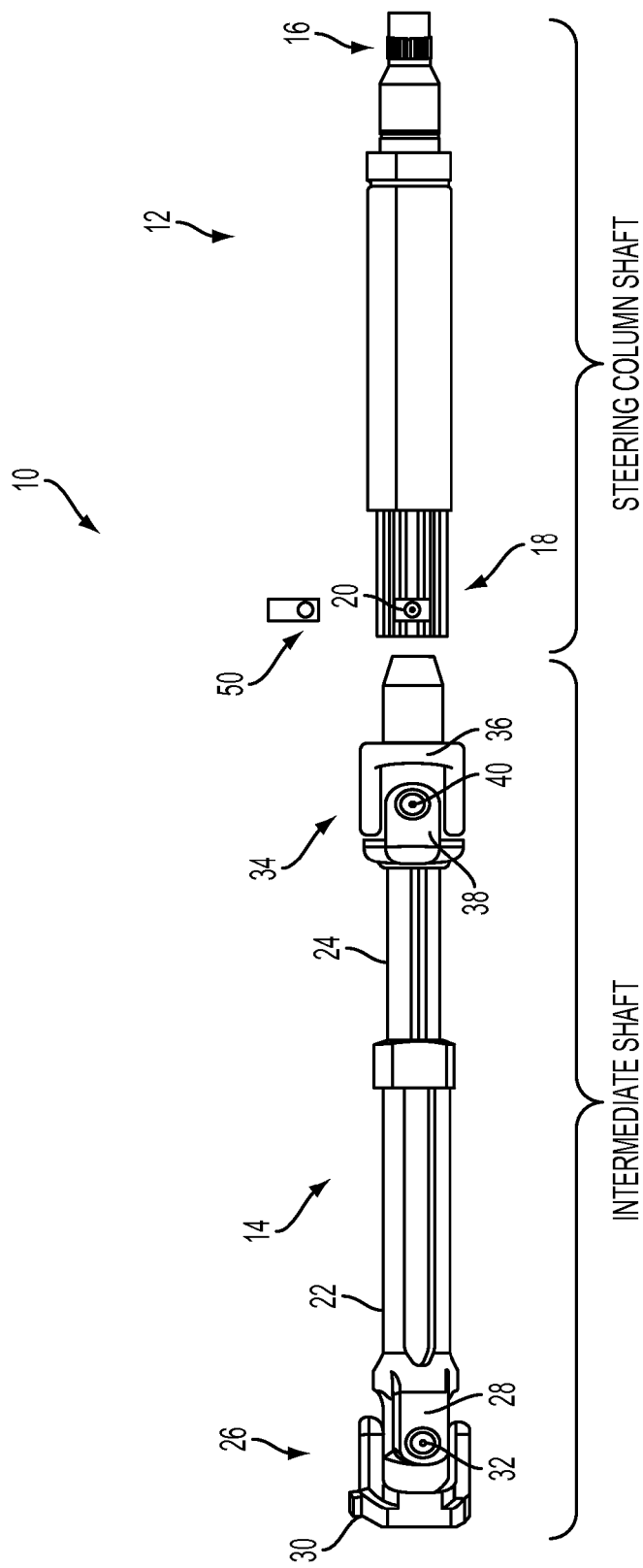
FIG. 1 illustrates an unassembled view of an exemplary steering column assembly.

Referring now to the Figures, where the invention will be described with reference to specific embodiments, without limiting same, an exemplary embodiment of a steering column assembly 10 for a vehicle is illustrated in FIG. 1. Although illustrated as a steering column assembly, the invention described herein may be used with any suitable shaft coupling. In the exemplary embodiment, steering column assembly 10 generally includes a steering column shaft 12 coupled to an intermediate shaft 14.

Steering column shaft 12 includes a first end 16 and an opposite second end 18. First end 16 is configured to couple to a hand wheel (not shown), and second end 18 is a tubular member configured to receive a portion of intermediate shaft 14 for coupling therebetween, as is described herein in more detail. Second end 18 includes an aperture 20 to receive a portion of a clip therein to couple steering column shaft 12 and intermediate shaft 14, as further described herein.

Intermediate shaft 14 includes a tubular shaft element 22 and a solid shaft element 24 telescoped into tubular shaft element 22 and coupled thereto by splines or the like for unitary rotation of intermediate shaft 14. A lower universal coupling 26 of intermediate shaft 14 includes an inner yoke 28 rigidly attached to tubular shaft element 22, an outer yoke 30 clamped to a steering gear input shaft (not shown), and a cross or spider 32 between yokes 28, 30. An upper universal coupling 34 of intermediate shaft 14 includes an outer yoke 36 coupled to steering column shaft second end 18, an inner yoke 38, and a cross or spider 40 between yokes 36, 38.

With reference to FIGS. 2-5, steering column assembly 10 includes a clip nut 50 and fastener 52 to facilitate coupling between yoke 36 and shaft 12. Clip nut 50 includes a connecting portion 54 extending between a first end 56 and a second end 58. In the exemplary embodiment, clip nut 50 is generally C-shaped such that first and second ends 56, 58 may be positioned on opposite sides of shaft 12. However, clip nut 50 may have any suitable shape that enables clip nut 50 to function as described herein. Further, clip nut 50 acts as a biased member (e.g., a spring) such that first and second ends 56, 58 are biased toward each other to facilitate coupling about shaft 12, as described herein in more detail.

Clip nut first end 56 includes an aperture 60, and clip nut second end 58 includes an inwardly extending projection portion 62 having an outer wall 63 (FIG. 2) and an inner wall 64 defining an aperture 66 therethrough. Outer wall 63 includes a first diameter for mating with a corresponding second diameter of aperture 20 and a third diameter of an aperture 80 of a base shaft 76, as described below. It will be appreciated that the second and third diameters are larger than first diameter to provide a redundant and immediately detectable feature of assembly 10 that signifies mating parts are positively assembled. Additionally or alternatively, first end 56 may include a similar inwardly extending projection portion. Apertures 60 and 66 are configured to receive fastener 52 therethrough. In the exemplary embodiment, inner wall 64 is threaded to threadably receive fastener 52 (e.g., a threaded bolt).

Figure 2:
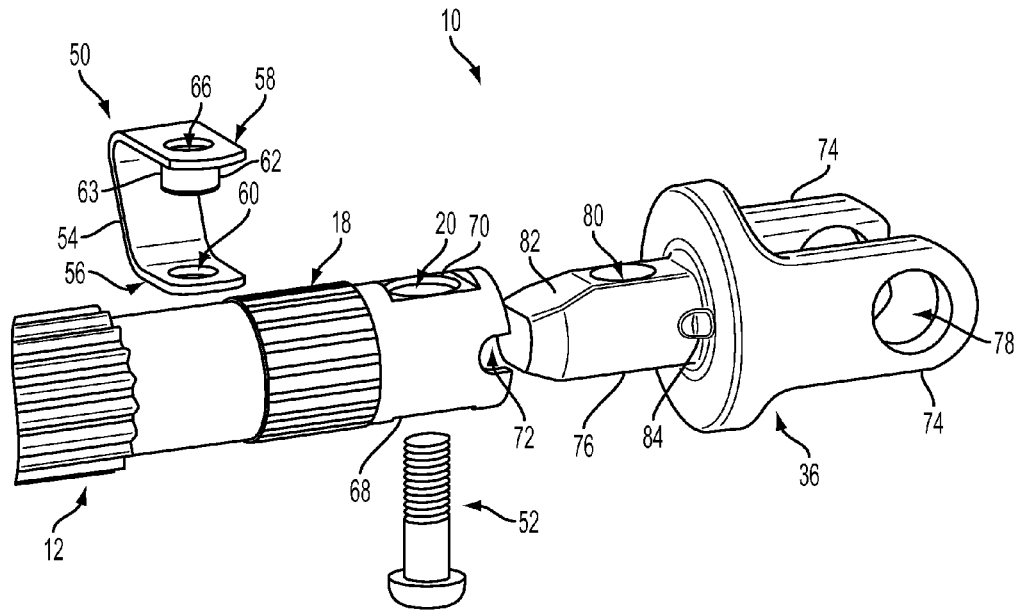
FIG. 2 illustrates an enlarged view of a portion of the assembly shown in FIG. 1.
Figure 3:
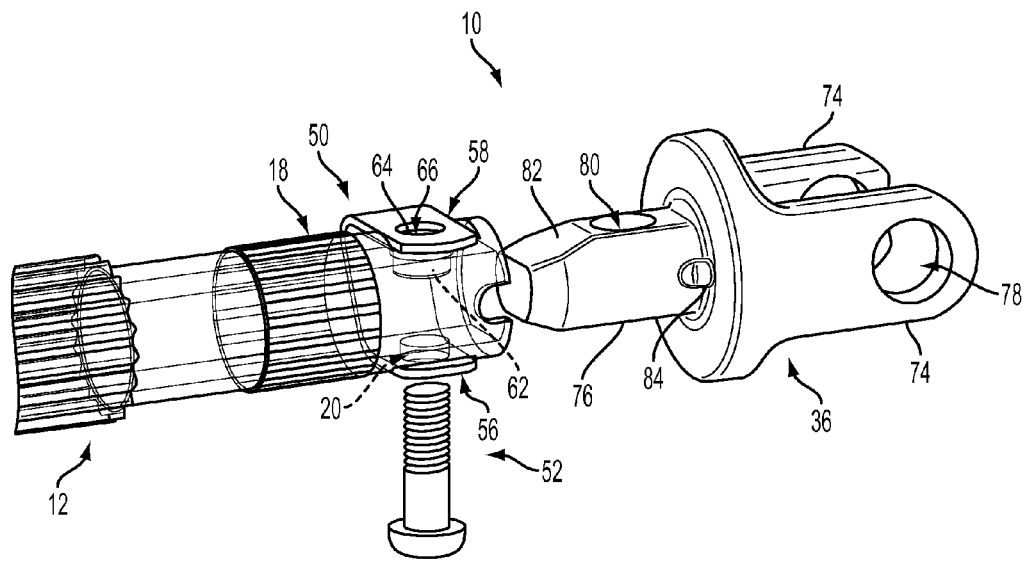
FIG. 3 illustrates the assembly shown in FIG. 2 with an exemplary clip nut assembled to a steering column shaft.
Figure 5:
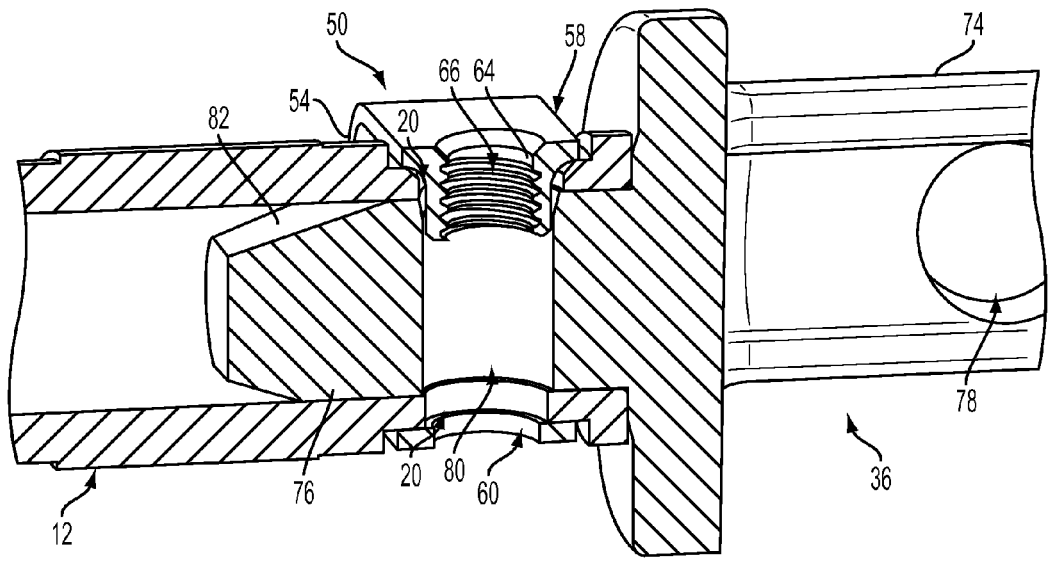
FIG. 5 is a cross-sectional view of the assembly shown in FIG. 4 taken along line 5-5.

In the exemplary embodiment, as shown in FIG. 2, shaft end 18 includes a first planar surface 68 and an opposite second planar surface 70 proximate apertures 20, which facilitate seating of respective first and second ends 56, 58 of clip nut (see FIGS. 3 and 5). However, shaft end 18 may have any suitable shape that facilitates seating or coupling of clip nut 50 to shaft 12. Shaft end 18 may also include one or more notches 72 formed therein.

As shown in FIG. 2, yoke 36 includes a pair of yoke ears 74 extending from a base shaft 76. Yoke ears 74 each include an aperture 78 to receive spider 40, and base shaft 76 includes an aperture 80 and a tapered or angled lead-in surface 82. Aperture 80 is configured to receive fastener 52 and lead-in surface 82 is configured to contact clip nut projection 62 during assembly of yoke 36 and shaft 12. Yoke 36 may also include one or more alignment projection 84, which may be oriented within notch 72 during assembly to facilitate alignment between yoke 36 and shaft 12.

In the exemplary embodiment, base shaft 76 has a double D cross-sectional profile and shaft end 18 has a mating internal profile that is also double D. Ramp 82 lines up with the double D flats so the direction of the bolt clamping force squeezes the flats together. This de-lashes the connection and provides torsional strength to assembly 10.

During assembly, clip nut 50 is positioned about shaft end 18 such that clip nut first end 56 and second end 58 are respectively seated against shaft first and second planar surfaces 68 and 70 (see FIG. 2). As such, clip first end aperture 60 is arranged concentrically or substantially concentrically to one shaft aperture 20 and clip projection 62 is inserted in and extends into the other shaft aperture 20. Alternatively, clip nut 50 may be preassembled to shaft end 18 to facilitate one handed assembly of yoke 36 and shaft 12.

Figure 4:
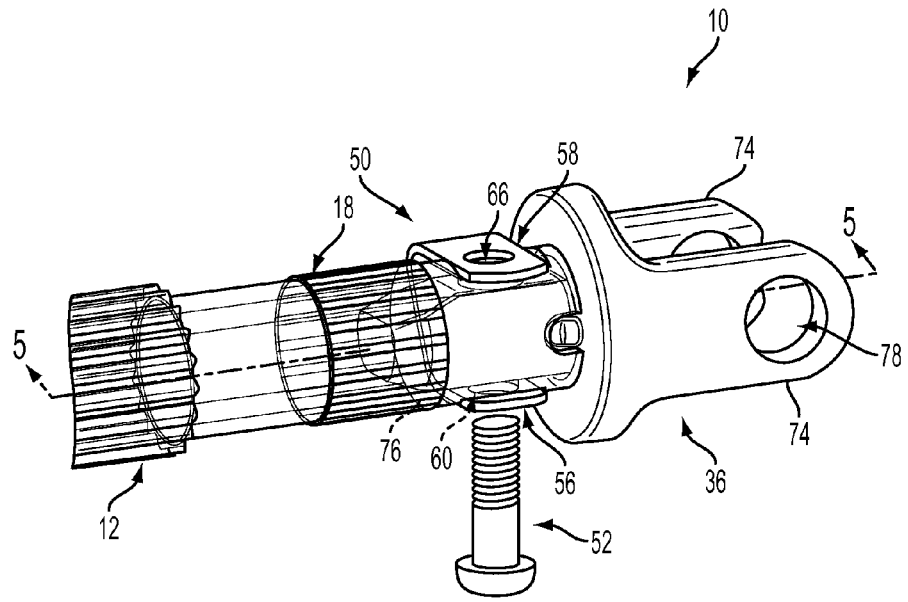
FIG. 4 illustrates the assembly shown in FIG. 3 with an exemplary yoke assembled to the shaft.

Yoke base shaft 76 is subsequently inserted into shaft second end 18 and lead-in surface 82 engages clip projection portion 62. Due to its ramped or angled surface, lead-in surface 82 biases clip projection portion 62 outward of aperture 20 to facilitate insertion of yoke 36 until yoke aperture 80 is positioned beneath projection portion 62. At this point, because clip nut ends 56, 58 are biased toward each other, clip projection portion 62 is biased into and seated within yoke aperture 80 to couple yoke 36 and shaft 18 (FIG. 4). Finally, fastener 52 is inserted into apertures 60, 20, 80, 66 and threadably secured to threaded inner wall 64 (see FIG. 5).

A method of assembling steering column assembly 10 includes providing steering column shaft 12, providing yoke 36, and providing clip nut 50 and fastener 52. Clip nut 50 is coupled to shaft end 18 such that clip projection portion 62 is inserted into shaft aperture 20. Yoke base shaft 76 is inserted into shaft end 18 until clip projection portion is seated in base shaft aperture 80. Fastener 52 is then inserted through clip nut 50, shaft 12, and yoke 36 to couple shaft 12 and yoke 36 together.

Described herein are steering column assemblies and methods thereof. The exemplary steering column assembly includes a clip nut that couples about a steering column shaft end. The clip nut includes a projection that extends into an aperture in the shaft and an aperture in a yoke when the yoke is inserted into the shaft. The clip nut is biased to hold the projection in the shaft and yoke to prevent decoupling therebetween. A fastener may then be inserted into the shaft, yoke and clip nut to further secure the components together. As such, the assembly includes redundant retention features if an attachment fastener becomes disengaged or is accidentally omitted in an assembly process. Further, the assembly includes a lower profile assembled package than some known nut and bolt assemblies, which facilitates use in limited package space environments.

In addition, the interrelationship between the different diameters of assembly 10 provides a means of immediately detecting that proper assembly of the outer yoke 36 to steering column 12 is complete. Clip nut 50 assembled only one way to create a peg-in-hole effect. It also provides a redundant attachment between yoke 36 and steering column 12 should bolt 52 not be properly threaded or threading misaligned. It will be appreciated that rather than differing diameters, outer diameter 63 ma instead have a unique outer shape for mating with a corresponding shape in apertures 20 and 80.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:
1. A shaft assembly comprising:
a tubular shaft having a first aperture and a second aperture formed therethrough, the tubular shaft comprising a cylindrical wall extending about a longitudinal axis;
a solid shaft having a third aperture formed therethrough, the tubular shaft being a steering column shaft and the solid shaft being a yoke having a base shaft configured for insertion into the steering column shaft in a coaxial direction with the longitudinal axis of the tubular shaft; and a clip nut having a first end, a second end, and a connecting portion extending therebetween, the first end having a fourth aperture and the second end having an inwardly extending projection portion with a fifth aperture extending therethrough, wherein the solid shaft is configured for insertion into the tubular shaft and the clip nut is configured for extending about the tubular shaft such that the projection portion extends into the first aperture and the third aperture, and wherein the first, second, third, fourth, and fifth apertures align, the solid shaft including a ramped lead-in surface configured to engage the projection portion and outwardly bias the clip nut second end until the solid shaft is oriented to receive the projection portion within the third aperture.

2. The assembly of claim 1, wherein a fastener extends through the first, second, third, fourth, and fifth apertures to positively connect the tubular shaft and the solid shaft.

3. The assembly of claim 1, wherein the clip nut is substantially C-shaped.

4. The assembly of claim 1, wherein the first and second ends of the clip nut are biased toward each other.

5. The assembly of claim 1, wherein the tubular shaft includes a first planar surface with the first aperture therethrough and a second planar surface with the second aperture therethrough, the clip nut first end configured to seat on the first planar surface and the clip nut second end configured to seat on the second planar surface.

6. The assembly of claim 1, wherein an end of the tubular shaft includes a notch and the solid shaft includes a projection configured for insertion into the notch to facilitate alignment between the tubular shaft and the solid shaft.

7. The assembly of claim 1, wherein the projection portion includes an inner wall defining the fifth aperture, wherein the inner wall is threaded.

8. The assembly of claim 7, further comprising a threaded fastener configured for coupling with the threaded inner wall.

9. A method of assembling a steering column assembly, the method comprising:

providing a steering column shaft having a first aperture and a second aperture formed therethrough, the steering column shaft is a tubular shaft comprising a cylindrical tubular wall extending about a longitudinal axis;

providing a yoke having a base shaft and a pair of yoke ears extending therefrom, the base shaft having a third aperture formed therethrough;

providing a clip nut having a first end, a second end, and a connecting portion extending therebetween, the first end having a fourth aperture and the second end having an inwardly extending projection portion with a fifth aperture extending therethrough;

positioning the clip nut about the steering column shaft such that the projection portion extends into the first aperture and the fourth aperture is aligned with the second aperture, the yoke including a ramped lead-in surface formed on the base shaft, the lead-in surface configured to engage the projection portion and outwardly bias the clip nut second end to facilitate insertion of the projection portion in the third aperture;

inserting the base shaft into the tubular shaft in a coaxial direction relative to the longitudinal axis of the tubular shaft until the third aperture is positioned to receive the projection portion therein; and inserting a fastener through the first, second, third, fourth, and fifth apertures to couple the steering column shaft and the yoke.

10. The method of claim 9, wherein the step of providing the clip nut further includes providing the clip nut having the first and second ends spring biased toward each other.

11. The method of claim 9, wherein the step of providing the clip nut further includes providing the clip nut with a threaded inner surface in the projection portion, the threaded inner surface configured for threaded coupling with the fastener.

* * * * *